Figure 1:
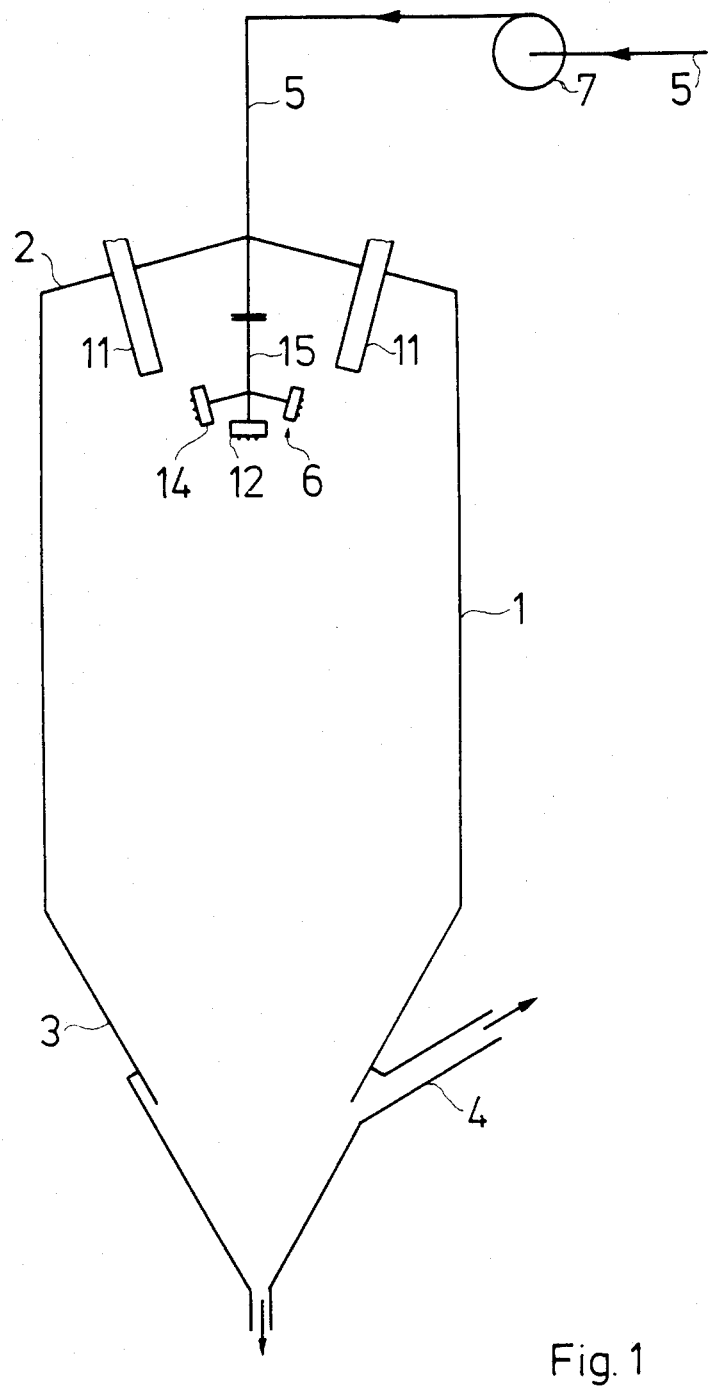

United States Patent

Damman et al.

[11] Patent Number: 4,501,639
[45] Date of Patent: Feb. 26, 1985

[54] PROCESS AND DEVICE FOR MAKING ALKALI METAL PHOSPHATES BY SPRAYING ALKALI METAL PHOSPHATE SOLUTIONS OR SUSPENSIONS

[75] Inventors: Ben Damman, Middelburg; Jan Drijver, Vlissingen; Hans Kinneging, Middelburg; Hans Scheffer; Jaap Stam, both of Vlissingen; Paul de Witte, Westkapelle, all of Netherlands

[73] Assignee: Hoechst Aktiengesellschaft, Fed. Rep. of Germany

[21] Appl. No.: 399,769

[22] Filed: Jul. 19, 1982

[30] Foreign Application Priority Data

Jul. 24, 1981 [DE] Fed. Rep. of Germany ....... 3129180

[51] Int. Cl.³ .......................... B01D 1/18; C01B 25/30
[52] U.S. Cl. ........................ 159/48.1; 159/3; 159/4 A; 423/305
[58] Field of Search ................ 159/48.1, 4 R, 4 A, 159/3; 423/305

[56] References Cited

U.S. PATENT DOCUMENTS

| | | | |
|---|---|---|---|
| 3,023,083 | 2/1962 | Rodis et al. | 159/48.2 |
| 3,499,476 | 3/1970 | Hartlapp et al. | 159/48.1 |
| 3,562,768 | 2/1971 | Edquist et al. | 159/48.1 |
| 3,577,864 | 1/1971 | Berg | 159/4 A |
| 3,607,019 | 9/1971 | Herink | 159/48.1 |
| 3,661,514 | 5/1972 | Herink | 159/4 A |

Primary Examiner—Wilbur Bascomb
Attorney, Agent, or Firm—Connolly and Hutz

[57] ABSTRACT

The disclosure relates to a process for making alkali metal phosphates, especially alkali metal polyphosphates, from alkali metal phosphate solutions or suspensions. To this end the solutions or suspensions are forced to flow through a plurality of single opening nozzle structures under a pressure of 6 to 66 bars and sprayed inside a tower through a flame zone produced by a plurality of burners arranged in annular fashion. The disclosure also relates to a device for carrying out the process, wherein a cylindrical spray tower (1) having a tapered lower end and being closed by means of a cover (2) has a solvent feed pipe (5) terminating in a spray means (6) centrally passed through the cover, and wherein a plurality of burners is passed through the cover (2), concentrically around the solvent feed pipe (5). The spray means (6) is comprised of a feed pipe (15) and at least one spray head (12), which has a plurality of single opening nozzle structures (17) disposed in its terminal surface area (13). At least one pressure-increasing pump (7) is disposed in the solvent feed pipe (5).

1 Claim, 4 Drawing Figures

PROCESS AND DEVICE FOR MAKING ALKALI METAL PHOSPHATES BY SPRAYING ALKALI METAL PHOSPHATE SOLUTIONS OR SUSPENSIONS

The present invention relates to a process for making alkali metal phosphates, especially alkali metal polyphosphates from alkali metal phosphate solutions or suspensions by spraying these solutions or suspensions inside a tower by means of at least one nozzle through a flame zone produced by a plurality of burners arranged in annular fashion, and to a device for carrying out the process.

It has already been described that alkali metal phosphates can be made by spraying an aqueous alkali metal phosphate solution containing alkali metal oxide and $P_2O_5$ in an appropriate ratio inside a cylindrical spray tower. Passed through the cover of the tower is a plurality of fuel gas feed pipes and passed centrally through the cover is a feed pipe for alkali metal phosphate solution, this latter feed pipe terminating in a multiple opening nozzle structure. A plurality of spaced apart burners which are passed through the cover is arranged in annular fashion along a circular line concentric to the feed pipe, the burner producing a flame zone. Sprayed therethrough is the alkali metal phosphate solution which undergoes evaporation, the resulting phosphates being successively condensed. Compressed air or steam maintained under a pressure of up to 12 bars is used as a propellent inducing the spraying operation (cf. "Ullmanns Encyklopädie der technischen Chemie", 4th edition, volume 18, pages 326 and 327; U.S. Pat. No. 3,499,476).

In order to ensure reliable operation of the spray tower it is necessary to use multiple opening nozzle structures designed and constructed so as to avoid relative displacement of various passageway-defining rings and adverse effects on the annular passageways (cf. U.S. Pat. No. 3,770,207).

An adverse effect which is associated with this prior process resides in the use of highly tensioned gases for spraying the phosphate solution which naturally entail considerable expenditure of energy. In addition to this, the process is effected with the use of complicated and hence costly multiple opening nozzle structures.

The present invention now provides a process for making alkali metal phosphates, especially alkali metal polyphosphates wherein it is not necessary for energy expensive spray-inducing media and complicated multiple opening nozzle structures to be used for spraying the solution. To this end, the invention provides for the alkali metal phosphate solutions or suspensions to be sprayed through a plurality of single opening nozzles under a pressure of 6 up to 66 bars.

A preferred feature provides for the alkali metal phosphate solutions or suspensions to be sprayed under a pressure of 10 up to 20 bars.

The device for carrying out the process of this invention wherein a cylindrical spray tower having a tapered lower end has a solvent feed pipe terminating in a spray means centrally passed through its cover, and wherein a plurality of burners is passed through the cover, concentrically around the solvent feed pipe, is characterized in that the spray means is comprised of a feed pipe and at least one spray head, which has a plurality of single opening nozzle structures (i.e., a single medium nozzle structure) disposed in its terminal surface area, and in that at least one pressure-increasing pump is disposed in the solvent feed pipe so as to form part thereof.

Preferred features of the device provide:

(a) for the terminal surface area of the spray head to be directed downwardly;
(b) for the spray means to comprise additional spray heads which are arranged above the first spray head and are formed with terminal surface areas inclined with respect to, and facing, the inside wall of the spray tower;
(c) for the additional spray heads to be connected in the direction of flow to the feed pipe by means of tubular structures;
(d) for the spray heads to have even terminal surface areas;
(e) for the spray heads to have their terminal surface areas arranged in stepwise fashion;
(f) for each spray head to have a single opening nozzle structure centrally installed in its terminal surface area and for additional single opening nozzle structures to be arranged along at least one circular line concentric to the center portion of the terminal surface area.

As compared with prior art products, the alkali metal polyphosphates made in accordance with this invention consist of particles with a narrower particle size distribution increasing the polyphosphate content by about 1%. In addition to this, the phase-I to phase-II-ratio in tripolyphosphate is more accurately adjustable. Still further, less agglomerated material is formed and more abrasion-resistant product is obtained.

By the process of the present invention it is made possible to vary the particle size and particle size distribution by varying the spray pressure.

It is also possible by causing the spray cones which issue through the individual nozzles of a spray head to overlap each other to effect agglomeration which results in products of especially low apparent density. The geometric configuration selected for the overlapping and the distance from the flame zone influence the degree and form of agglomeration.

In the device used for carrying out the present process, it is possible for the spray heads to be provided with central or centrifugal single opening nozzles which have bores 0.5 up to 5 mm wide disposed in their terminal surface areas.

Figure 2:
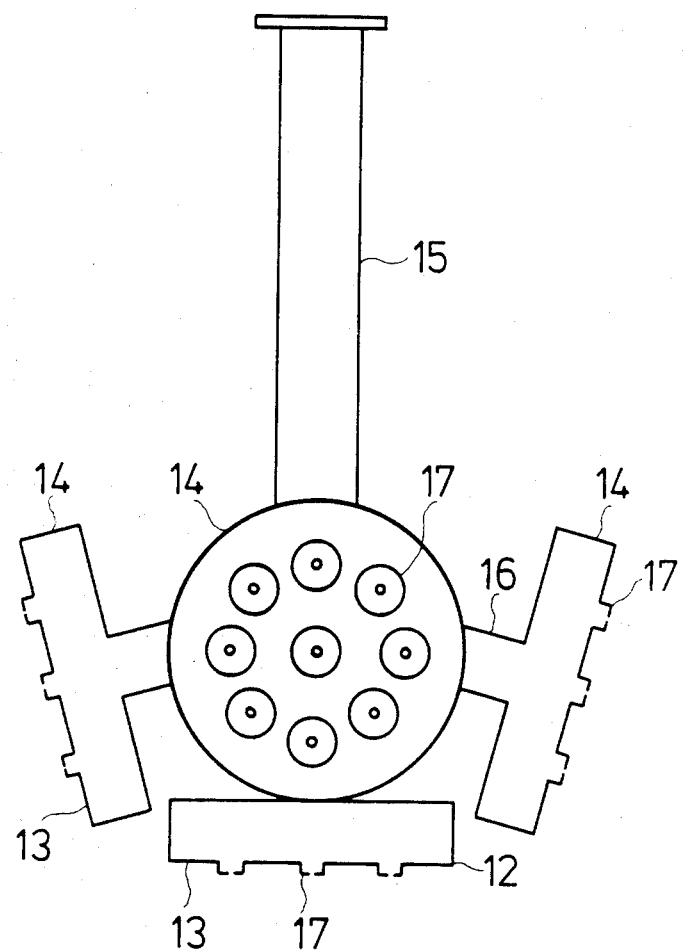
Figure 3:
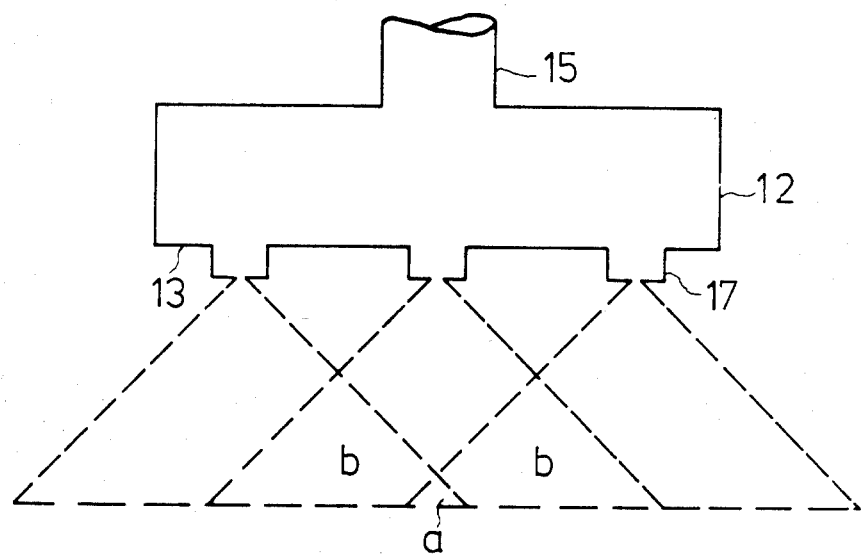
Figure 4:
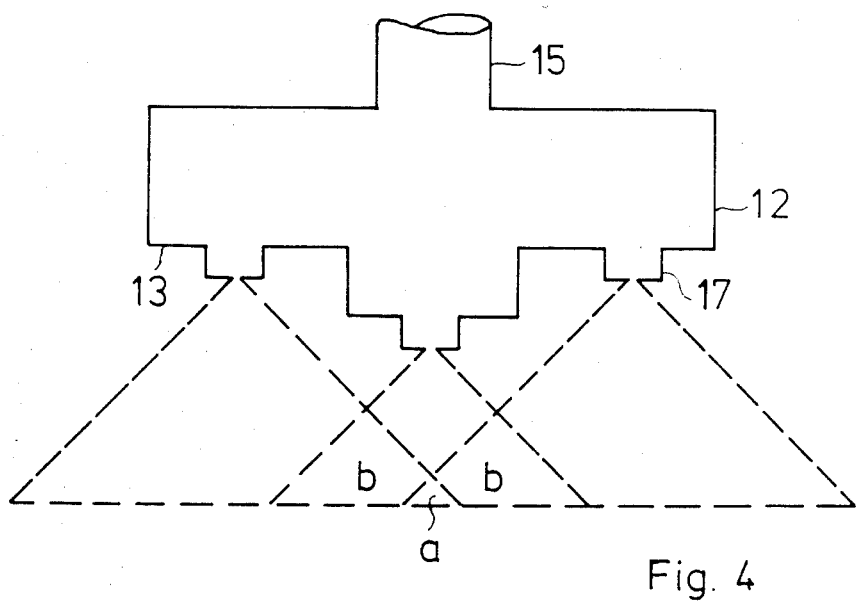

An apparatus for carrying out the present process is shown diagrammatically and partially in section in the accompanying drawings, in which FIG. 1 is a side elevational view of a spray tower,
FIG. 2 is a side elevational view of a spray-inducing means, and
FIGS. 3 and 4 are side elevational views of spray heads formed with differently designed terminal surface areas.

With reference to the drawings:

A cylindrical spray tower 1 is closed by means of a conical cover 2 and provided with a tapered lower base portion 3 with off-gas outlet 4. The conical cover 2 has a solvent feed pipe 5 centrally passed through it, the solvent feed pipe 5 terminating inside the spray tower 1 in a spray-inducing means 6. Arranged outside the spray tower 1 is at least one pressure-increasing pump 7 forming part of the solvent feed pipe 5. A plurality of burners 11 which are passed through the conical cover 2 so as to open in inclined position into the spray tower 1, are arranged along a circular line concentric to the solvent feed pipe 5.

The spray-inducing means 6 is comprised of a feed pipe 15 of which one end is connected, in the direction of flow, to the solvent feed pipe 5 and of which the other end has a spray head 12 with a downwardly directed terminal surface area 13 secured thereto.

Arranged at a level higher than spray head 12 are additional spray heads 14. Their terminal surface areas 13 are directed downwardly in inclined position so as to face the inside wall of the spray tower 1, and they have pipe connections 16 running to the feed pipe 15. The spray heads (12, 14) have a plurality of single opening nozzles 17 installed in their terminal surface areas 13.

The terminal surface area 13 of each spray head (12, 14) may be even or may be arranged in stepwise fashion. The configuration selected permits the overlapping intensity of the spray cones issuing from the various nozzles 17 to be acted upon (region a: mutual overlapping of three cones; region b: mutual overlapping of two spray cones).

In the following Examples, the particle size distribution is indicated in % proportions of the particles retained on tests sieves with meshes having the inside width in mm specified (in accordance with DIN 1171; DIN stands for German Industrial Standard).

EXAMPLE 1 (PRIOR ART EXAMPLE)

The spray tower which was 15 m high and 7 m wide was provided with a multiple opening nozzle as disclosed in U.S. Pat. No. 3,770,207 as the spray inducing means and steam was used as spray medium. Through an inner feed pipe maintained under a pressure of 12 bars, the nozzle was fed with 2.5 ton/h of steam, and through an outer feed pipe maintained under a pressure of 5 bars, it was fed with 1.5 ton/h steam. Sprayed through the central nozzle opening about 0.9 mm wide were 12 $m^3/h$, corresponding to 18 tons/h, sodium orthophosphate solution containing $Na_2O$ and $P_2O_5$ in a ratio of 5:3, the spraying being effected under a pressure of 4.5 bars. 8.3 ton/h sodium tripolyphosphate which contained 97% $Na_5P_3O_{10}$ and had an apparent density of 720 g/l was obtained. The sodium tripolyphosphate had the following particle size distribution:
  0.750 mm: 1%
  0.150 mm: 65%
  0.075 mm: 92.5%.

Sodium tripolyphosphate made with the use of urea as an inflating agent but under otherwise identical conditions had an apparent density of 470 g/l and the following particle size distribution:
  0.750 mm: 22.2%
  0.150 mm: 85.9%
  0.075 mm: 92.4%.

EXAMPLE 2 (INVENTION)

The spray tower of Example 1 was provided with a spray-inducing means which was a feed pipe terminating in 6 spray heads of which each was comprised of 7 single opening nozzles, each with a 3 mm wide bore. 8.5 $m^3/h$, corresponding to 13.2 ton/h, sodium orthophosphate solution containing $Na_2O$ and $P_2O_5$ in a ratio of 5:3, was sprayed under a pressure of 15 bars through the altogether 42 nozzles. 6.8 ton/h sodium tripolyphosphate which contained 97.5% $Na_5P_3O_{10}$ and had an apparent density of 700 g/l was obtained. The sodium tripolyphosphate had the following particle size distribution:
  0.750 mm: 2.5%
  0.150 mm: 82.0%
  0.075 mm: 96.3%.

EXAMPLE 3 (INVENTION)

The spray tower of Example 1 was provided with a spray-inducing means which was a feed pipe terminating in 10 spray heads of which each was comprised of 7 single opening nozzles, each with a 2 mm wide bore. 13 $m^3/h$, corresponding to 20.1 ton/h, sodium orthophosphate solution containing $Na_2O$ and $P_2O_5$ in a ratio of 5:3 was sprayed under a pressure of 28 bars through the altogether 70 nozzles. 10.4 ton/h sodium tripolyphosphate which contained 98.% $Na_5P_3O_{10}$ and had an apparent density of 720 g/l was obtained. The sodium tripolyphosphate had the following particle size distribution:
  0.750 mm: 0.2%
  0.150 mm: 71.6%
  0.075 mm: 94.0%.

EXAMPLE 4 (INVENTION)

8 $m^3/h$, corresponding to 12.5 ton/h, sodium orthophosphate solution which contained $Na_2O$ and $P_2O_5$ in a ratio of 5:3 and was admixed, per $m^3$, with 6 kg urea as inflating agent was sprayed under a pressure of 9 bars inside the spray tower of Example 1 provided with the spray-inducing means of Example 3. 6.4 ton/h hollow bead-shaped sodium tripolyphosphate which contained 96.5% $Na_5P_3O_{10}$ and had an apparent density of 430 g/l was obtained. The sodium tripolyphosphate had the following particle size distribution:
  0.750 mm: 0.5%
  0.150 mm: 91.1%
  0.075 mm: 98.0%.

EXAMPLE 5 (PRIOR ART EXAMPLE)

12 $m^3/h$, corresponding to 17.8 ton/h, sodium orthophosphate solution containing $Na_2O$ and $P_2O_5$ in a ratio of 2:1 was sprayed under a pressure of 3.5 bars inside the spray tower fitted with a multiple opening nozzle as the spray inducing means of Example 1. 8.4 ton/h tetrasodium pyrophosphate which contained 96% $Na_4P_2O_7$ and had an apparent density of 650 g/l was obtained. The tetrasodium pyrophosphate had the following particle size distribution:
  0.750 mm: 1%
  0.150 mm: 43.4%
  0.075 mm: 77.2%.

EXAMPLE 6 (INVENTION)

The spray tower of Example 1 was provided with a spray-inducing means which was a feed pipe terminating in 4 spray heads of which each was comprised of 8 single opening nozzles, each with a 3.4 mm wide bore. 12 $m^3/h$, corresponding to 17.7 ton/h, sodium orthophosphate solution containing $Na_2O$ and $P_2O_5$ in a molar ratio of 2:1 was sprayed under a pressure of 15 bars through the altogether 32 nozzles. 8.4 ton/h tetrasodium pyrophosphate which contained 96% $Na_4P_2O_7$ and had an apparent density of 620 g/l was obtained. The tetrasodium pyrophosphate had the following particle size distribution:
  0.750 mm: 0.2%
  0.150 mm: 60.1%
  0.075 mm: 85.1%.

We claim:

1. In a process for making alkali metal phosphates or alkali metal polyphosphates from feed materials selected from solutions and suspensions of alkali metal phosphates by introducing the feed materials in the upper portion of a spray tower, spraying them inside said spray tower through a flame zone produced by a plurality of burners arranged in annular fashion and collecting the dried alkali metal phosphates or metal polyphosphates, the improvement which comprises putting the feed materials under a pressure of 10 to 66 bars by means of at least one pressure-increasing pump; and spraying the feed materials by forcing them under said pressure in the absence of highly pressurized gases through a plurality of single opening nozzles, said single opening nozzles having bores 0.5 up to 5 mm wide disposed in their terminal surface areas.

* * * * *